C. E. KENT.
HOOK.
APPLICATION FILED JUNE 4, 1919.
1,389,833.
Patented Sept. 6, 1921.
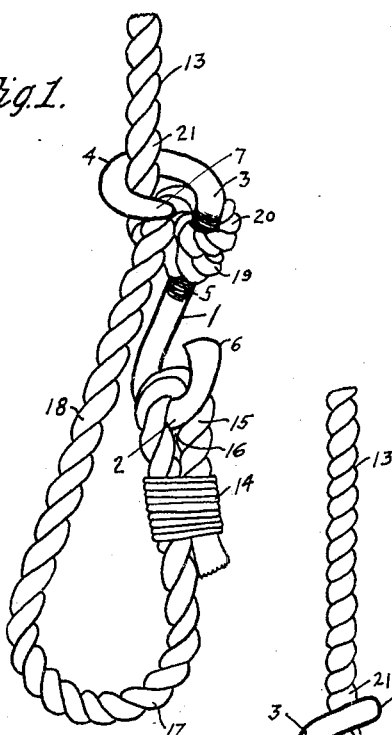
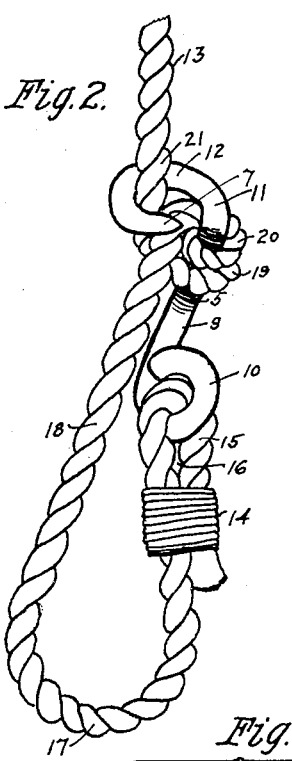
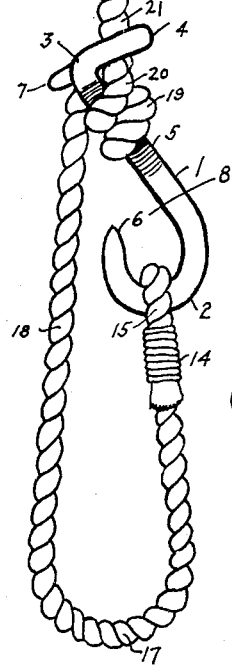
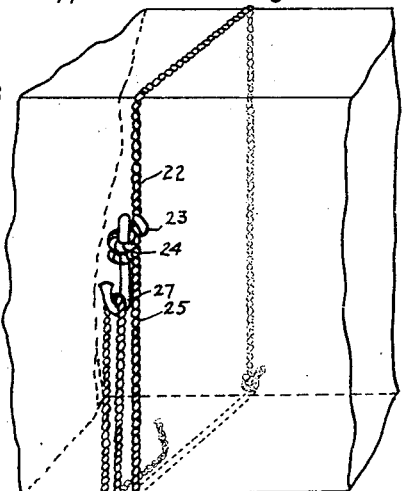
INVENTOR.
CHARLES E. KENT
BY
Hazard & Miller
ATTORNEY.

UNITED STATES PATENT OFFICE.

CHARLES E. KENT, OF LOS ANGELES, CALIFORNIA, ASSIGNOR OF ONE-FOURTH TO WALTER L. BOWERS, OF LOS ANGELES, CALIFORNIA.

HOOK.

1,389,833.  Specification of Letters Patent.  Patented Sept. 6, 1921.

Application filed June 4, 1919. Serial No. 301,796.

*To all whom it may concern:*

Be it known that I, CHARLES E. KENT, a citizen of the United States, residing at Los Angeles, in the county of Los Angeles and State of California, have invented new and useful Improvements in Hooks, of which the following is a specification.

My object is to make a hook for fastening binding ropes, tow lines and the like, and my invention consists of the novel features herein shown, described and claimed.

Figure 1 is a perspective showing a hook embodying the principles of my invention in use.

Fig. 2 is a view analogous to Fig. 1 and showing a modification of the hook.

Fig. 3 is a view analogous to Fig. 1 and taken from a different angle.

Fig. 4 is a fragmentary perspective illustrating the use of the hook.

The hook is formed of a piece of heavy round rod and comprises the straight central portion 1, the lower return bend 2, the upper right angle bend 3, and the upper return bend 4.

The upper portion of the straight central portion 1 has corrugations or ribs 5 to assist in holding the rope from slipping. The free end 6 of the lower return bend 2 is flattened and widened. The free end 7 of the upper return bend 4 is pointed or rounded. The right-angled bend 3 extends in the opposite direction from the lower return bend 2.

In the preferred construction shown in Figs. 1 and 2 there is a gap 8 between the free end 6 and the lower end of the straight portion 1.

In the modification shown in Fig. 2 the lower end of the straight central portion 9 is integral with the eye 10 and the right-angled bend 11 and the return bend 12 are the same as the right-angled bend 3 and the return bend 4.

The rope 13 has its lower end bent closely upon itself and secured by a small cord 14, thus producing the rope eye 15. This rope eye will readily pass over the widened end 6 when turned into position with the length of the eye space 16 parallel with the edge 6, and then when the eye has been drawn down into the bend 2 it will not unhook and cannot be removed until it is turned in the proper position.

The rope 13 may be bent to form the rope loop 17 and then the body 18 of the rope grasped to wind the rope around the straight central portion 1 to make the turns 19 and 20 and then the body 21 of the rope may be passed upwardly through the return bend 4, thus making a knot which will not slip upon the hook and which may be readily undone simply by passing the portion 21 out of the return bend 4 and unwinding the rope from the straight central portion 1.

In Fig. 4 I have shown a rope 22 having my hook 23 incorporated into the rope by the non-slipping knot 24 and the portion 25 of the rope is passed downwardly around the hitch 26 and upwardly over the open return bend 27 of the hook and then downwardly, and the end 28 of the rope may be pulled to tighten the main body of the rope to the desired extent. Passing the rope around the hitch 26 and then over the hook 27 gives the operator a great advantage in that the power is multiplied as in a block and tackle. The end 28 may be secured in any suitable way after the rope has been drawn taut.

There are many uses and many ways in which the hook may be applied to advantage.

Various changes may be made without departing from the spirit of my invention as claimed.

I claim:

1. A hook for tow lines and the like comprising a central shank having a corrugated section to assist in holding a rope hitch, a return bend at one end of the shank having a flattened and widened end, a right angle bend at the shank end opposite to the return bend and a second return bend beyond the right angle bend arranged transversely relative to the first named return bend.

2. A hook for tow lines and the like comprising a central shank for holding a rope hitch, a return bend at one end of the shank having a flattened and widened end, a right angle bend at the shank end opposite to the return bend, and a second return bend beyond the right angle bend arranged transversely relative to the first named bend.

In testimony whereof I have signed my name to this specification.

CHARLES E. KENT.